United States Patent [19]

Deprez

[11] 4,189,267
[45] Feb. 19, 1980

[54] CLAMPING MEANS FOR REDUCING DEFLECTIONS IN MACHINE TOOL

[75] Inventor: Thomas A. Deprez, Rochester, N.Y.

[73] Assignee: The Gleason Works, Rochester, N.Y.

[21] Appl. No.: 934,231

[22] Filed: Aug. 16, 1978

[51] Int. Cl.² .............................................. B23F 5/28
[52] U.S. Cl. ..................................... 409/59; 409/262; 409/256
[58] Field of Search ...................... 90/10, 8, 76, 78, 77

[56] References Cited

U.S. PATENT DOCUMENTS

| | | | |
|---|---|---|---|
| 1,469,602 | 10/1923 | Perkin et al. ............................... | 90/8 |
| 2,751,823 | 6/1956 | Freter ........................................ | 90/8 |
| 2,895,385 | 7/1959 | Carlsen ................................... | 90/6 X |
| 3,552,262 | 1/1971 | Hunkeler ................................ | 90/1 X |
| 3,964,369 | 6/1976 | Hunkeler ..................................... | 90/5 |

*Primary Examiner*—William R. Briggs
*Attorney, Agent, or Firm*—Morton A. Polster; Ralph E. Harper

[57] ABSTRACT

A clamping means is provided between a movable housing and a fixed structure of an endless chain machine for reducing deflections between cutting tools carried by the movable housing and a workpiece carried by a separate housing of the machine.

3 Claims, 3 Drawing Figures

CLAMPING MEANS FOR REDUCING DEFLECTIONS IN MACHINE TOOL

BACKGROUND AND BRIEF DESCRIPTION OF INVENTION

It is known in the art of broaching to provide for machines which utilize an endless chain for carrying a series of tools into contact with one or more workpieces. Additionally, it is known to utilize machines of this type for producing spur and helical gears. Examples of early machine designs for producing gears with tools carried on articulated links making up an endless chain are disclosed in U.S. Pat. Nos. 1,468,393; 1,469,602; 2,475,690; 2,692,537; and 2,749,804.

Machines utilizing an endless chain for carrying a plurality of tools offer a potential for very high speed production of whatever shape of workpiece is being formed by the tools. In fact, in the case of gear production, it is contemplated that stacks of gear blanks may be worked simultaneously with machinery of this type, rather than one at a time as has been the case with many other types of gear forming (cutting or grinding) machines. However, the requirements for gear manufacture are far more severe than those for other forms of broaching, and therefore, machines of this type have not been, as far as is known, commercially acceptable for high production gear manufacturing needs.

The forming of gear tooth profiles on a work blank requires precise control of an engagement between a workpiece and each stock removing tool, and this requirement demands, in turn, a very rigid machine which maintains precise placement of workpiece and tool under a working load and for a sustained operation of the machine. In machines utilizing endless chains for carrying tools, it is a typical arrangement to provide for a first housing for supporting the endless chain and a second housing for carrying a work spindle which supports one or more work blanks. These two separate housings are mounted on a base in such a way that they can be moved relative to each other to provide for feeding movements of the tools into and out of engagement with different diameters of workpieces. In addition, relative movement may be provided for traversing the workpiece relative to the endless chain and its stock removing tools for generating a series of tooth profiles around the workpiece as it rolls and rotates past the cutting tools.

Provision for relative movement between major housings of a machine tool of this type necessarily reduces the overall rigidity of the machine, and this leads to unwanted deflections between the tools and the workpiece during cutting or grinding operations. Such deflections tend to vary with different stock removal operations and methods, and these deflections are transmitted through the support structures of the machine in the manner of a "spring loop" from the stock removal tools, through the chain support, and back through the work support to the point-of-operation where the tools are engaging the workpiece. In general, the larger the "spring loop," the greater is the loss of precision in maintaining a known relationship between the tools and the workpiece.

It is known to provide for various clamping devices in other forms of gear cutting machinery to control machine rigidity during cutting strokes of a cutter (see, for example, U.S. Pat. Nos. 2,895,385; 3,552,262; and 3,964,369), however it is believed that no similar provision has been made for the type of chain cutting machine contemplated herein. In accordance with the present invention, a very simple clamping means is provided to effectively shorten the spring loop that exists in machinery of the type contemplated, and this, in turn, reduces unwanted deflections between major components of the machine. This is done with a clamping means operative between the housing for the endless chain and the housing for the workpiece, and the clamping means is effective when the stock removing tools of the machine are in engagement with the workpiece. One of the features of the clamping means of the present invention is that it does not interfere with transverse relative movements that are desired between the two major housings which support the stock removing tools and the workpiece, and this is accomplished by mounting a first part of the clamping means on the housing for the endless chain while mounting a second part of the clamping means on a fixed structure of the machine. Thus, the first part of the clamping means is located close to the point at which the cutting forces are transmitted into the chain housing, while the second part of the clamping means is located close to the point where the workpiece is carried. Although this does not constitute a direct link between the housing for the endless chain and the housing for the workpiece (since the workpiece housing must move during a cutting operation), it does provide for an operative clamping of the two major housings since the chain housing is significantly reinforced by its attachment to the fixed structure of the machine and any small remaining deflections of the endless chain housing tend to be followed by the workpiece. In this manner, it is possible to clamp up the machine when it reaches a full depth of stock removal relative to a workpiece even though transverse relative movement between the stock removing tools and the workpiece may be required during the forming operation. Also, the clamping means is operative over a wide range of helix angle positions of the endless chain relative to the workpiece.

In accordance with a specific embodiment of the invention, the clamping means includes a hydraulically operated actuating means for bringing its first and second parts into and out of clamping engagement. The hydraulically operated actuating means includes a piston fitted for reciprocation within a chamber, as carried by fixed structure of the machine, and a hydraulic circuit is provided for delivering a controlled flow of hydraulic fluid to the chamber to cause the piston to move in one direction or another within the chamber.

These and other features of the invention will become apparent in the more detailed discussion which follows, and in that discussion reference will be made to the accompanying drawings as briefly described below.

DETAILED DISCUSSION

Figure 1:
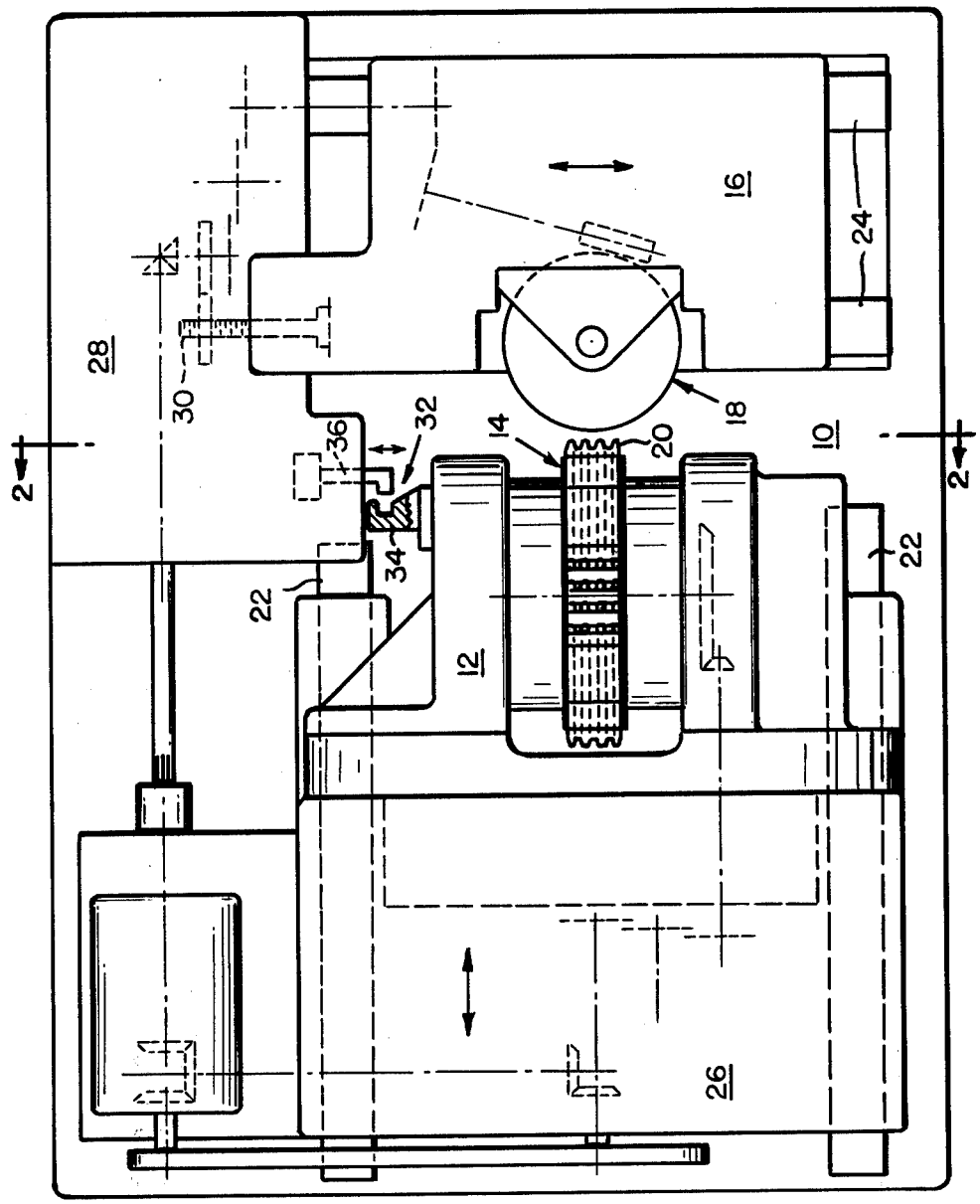
FIG. 1 is a top plan view of a machine tool of the type contemplated herein, showing an endless chain carried in a first housing which is movable relative to a second housing for carrying a workpiece.
Figure 2:
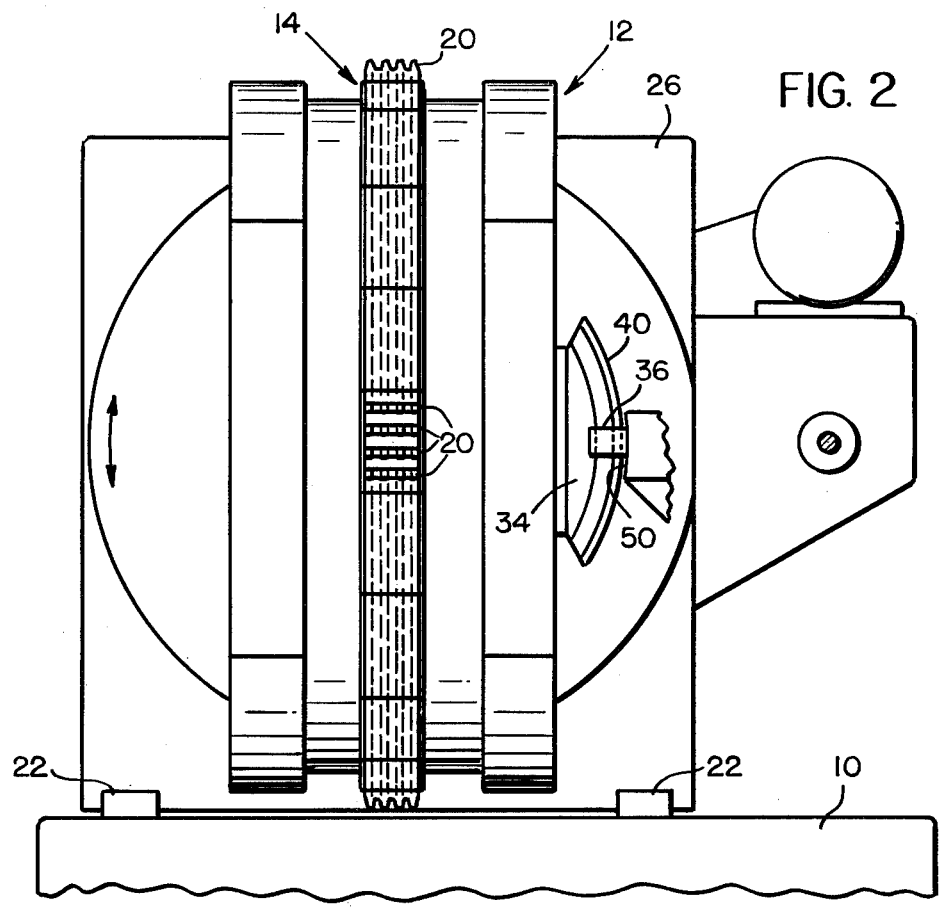
FIG. 2 is a front elevational view of a portion of the machine shown in FIG. 1, showing an elevation of the endless chain and its associated housing together with a first part of a clamping means for securing that housing to fixed structure of the machine.

FIGS. 1 and 2 show basic components for endless chain machines of the type contemplated by the present invention. Such machines typically include a base 10 upon which are mounted two or more housings for containing working components of the machine. In the illustrated embodiment, there is a first major housing 12 which carries an endless chain 14 together with a second major housing 16 which supports a workpiece 18. The endless chain 14 carries one or more rows of stock removing tools 20, as is known in this art, for engaging and removing stock from the workpiece 18. The stock removal tools may comprise cutting blades or grinding elements. The workpiece 18 is shown as a cylindrical blank of the type which might be used for forming a spur or helical gear, but other shapes and forms of workpieces are contemplated herein.

As is known with machines of this general type, it is necessary to provide for relative movement between the two major housings 12 and 16 and the tools and workpiece carried respectively therein. In the illustrated embodiment, the two major housings 12 and 16 are relatively movable toward and away from each other through a provision for advancing and retracting the housing 12 on ways 22 in accordance with known assemblies and techniques. This provides for a feeding movement for the tools 20 relative to the work blank 18 so that the stock removing tools can be brought into a full depth engagement for whatever type of stock removal is required for a particular workpiece. In addition, the workpiece housing 16 is illustrated as being mounted on ways 24 for being traversed from side-to-side relative to the endless chain housing 12. This additional motion is desired for certain gear manufacturing processes which involve a traversing movement of a workpiece relative to the tools while the cutting tools are engaged with the workpiece and the workpiece is revolving about an axis. FIG. 1 schematically illustrates a type of drive train that is provided in a machine of this type for timing the driving relationship between the endless chain 14 and the workpiece 18. Such drive trains are generally known from the prior art as shown, for example, in the U.S. Patents identified above.

Although not necessary for an understanding or practice of the present invention, it can be seen that the major housing 12 for the endless chain 14 is mounted to a structure 26 which may be considered an extension of the major housing 12. However, as shown in FIG. 2, the mounting of the major housing 12 (for the endless chain 14) relative to the extension housing 26 is such that the endless chain 14 can be tilted about a horizontal axis. This arrangement is also known in the art and is included for setting a helix angle on the path of travel of the stock removing tools 20 relative to a workpiece which is being shaped into a helical gear.

FIG. 1 also shows an intermediate housing 28 which is fixed to the base 10 of the machine and which does not move relative to the base. This housing contains many of the ratio change gears and other components associated with the drive train of the machine and includes a worm drive 30 for traversing the housing 16 on its ways 24.

In its most basic form, the present invention is concerned with a problem of limiting deflections which occur between the stock removing tools 20 and a workpiece 18 over a wide range of settings for the type of machine which is illustrated. Since major housing components 12 and 16 must be movable relative to each other for purposes of feeding and for purposes of carrying out certain stock removing processes, it can be appreciated that the machine is not as rigid as it otherwise might be if all housings could be securely fixed relative to the base 10. In fact, the support structures for the endless chain and the workpiece form a spring loop of considerable length with the result that relative deflections between the two can become excessive under heavy cutting (or grinding) loads. These deflections also vary as the cutting load changes during gear forming operations, and therefore, it is important to minimize deflections in order to control tooth geometry. Machine deflections are especially noticeable when the endless chain 14 is tilted at a helix angle to form or shape a helical gear. In such an attitude, transverse forces are created between the stock removing tools 20 and the workpiece 18 as the stock removal process takes place, and this tends to deflect or move the major housing 12 relative to the major housing 16 in a way that detracts from a precise relationship between stock removing tool and workpiece.

Figure 3:
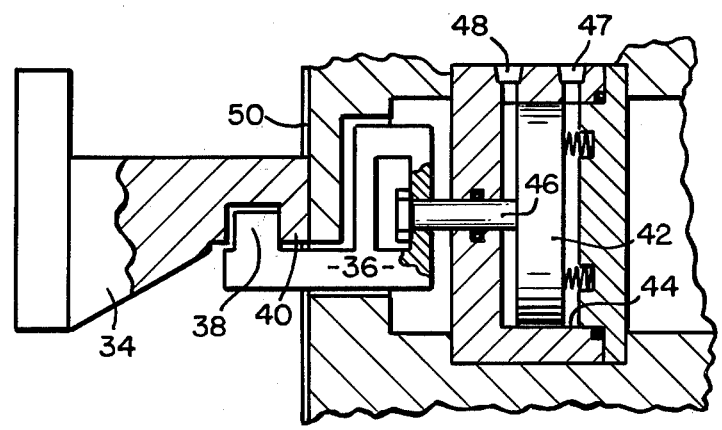
FIG. 3 is a top plan view, greatly enlarged from that of FIG. 1, showing details of the clamping means of the present invention.

In order to overcome this problem, the present invention provides for a clamping means 32 which is operatively connected between the two major housings 12 and 16. FIGS. 1 and 3 show the clamping means 32 as including a first part 34 carried by the housing 12 for the endless chain 14 and a second part 36 carried by the intermediate, fixed housing 28. The intermediate housing 28 is, in turn, connected to the workpiece housing 16 (by way of the worm drive 30), and this completes the operative connection between the major housings 12 and 16. It can be seen that the positioning of the clamping means 32 serves to shorten the spring loop that otherwise exists between stock removing tools and the workpiece so that force deflections therebetween are effectively limited. Once the two parts of the clamping means 32 are brought into engagement (as shown in FIG. 3), there is a relatively rigid engagement between the housing 12 and the fixed structure of the housing 28. This substantially reduces unwanted deflections between the tools and the workpiece.

Referring to FIG. 3, the clamping means is designed so that its first part 34 engages with its second part 36 when the housing 12 is advanced into a full feed position relative to a workpiece 18. FIG. 1 shows the separate parts of the clamping means in a disengaged position, and FIG. 3 illustrates the engaged position. By positioning the second part 36 in a housing separate from the movable workpiece housing 16, it is possible to provide for traversing movements of the housing 16 even when the clamping means is in an engaged and operative position.

The clamping means is provided with an actuating means for moving the second part 36 transversely of the first part 34, and this movement provides for a tight clamping between the jaw 38 of the second part 36 and the jaw 40 of the first part 34. The actuating means includes a piston 42 fitted within a chamber 44, and the piston is connected to the second part of the clamping means by way of a connecting rod 46. A hydraulic circuit (not shown) of conventional design is provided for delivering a controlled flow of hydraulic fluid to the chamber 44 through the ports 47 and 48 to cause a movement of the piston 42 in one direction or another within the chamber 44. Such movement serves to bring the jaws 38 and 40 of the clamping means into and out of tight engagement with each other and with a bearing surface 50 on the housing 28.

As shown in FIG. 2, the jaw 40 of the first part 34 of the clamping means 32 is in the form of an arcuate sector so that the second part 36 can engage and clamp the first part in a range of angular positions of the housing 12 relative to the extension housing 26. The first part of the clamping means is mounted directly on the housing 12 so as to follow its rotational movements within the housing 26. The bearing surface 50, which is formed on the housing 28, is concave in shape to accommodate the external arcuate shape of the jaw portion 40 of the first part 34 of the clamping means.

In operation, the stock removing tools are advanced toward the workpiece until a desired depth of engagement is achieved. At this depth the positions of the two jaws 36 and 38 of the clamping means are in an overlapping relationship, and the clamping means is actuated to draw the jaws toward the bearing surface 50 to provide a tight securement of the movable housing 12 to the fixed housing 28. This relationship is maintained while the stock removal process continues. The clamping means is released whenever it is desired to withdraw the stock removing tools from the workpiece, and the two parts of the clamping means are completely separated when such withdrawal takes place.

Having described a specific embodiment of the clamping means of this invention, it can be appreciated that equivalent structures and variations thereof may be substituted for those described and discussed above. All such variations and equivalent structures are intended to be included within the scope of protection sought herein as described in the claims below.

What is claimed is:

1. In a machine of the type that includes an endless chain for carrying stock removing tools which can engage a workpiece to remove stock therefrom, and in which the endless chain and the workpiece are carried by separate housings that are relatively movable toward and away from each other, the improvement comprising clamping means operative between the housing for said endless chain and the housing for said workpiece for effectively limiting force deflections between said stock removing tools and said workpiece when the tools are removing stock from the workpiece, said clamping means being characterized by a first part carried by the housing for said endless chain, said first part being in the form of an arcuate sector which is engageable by a second part of said clamping means over a range of tilted positions of said endless chain relative to a workpiece.

a second part carried by a fixed structure of said machine, and actuating means connected to said second part for moving said second part into and out of clamping engagement with first part, said actuating means including a piston fitted for reciprocation within a chamber, said piston being connected to said second part of said clamping means, and including a hydraulic circuit for delivering a controlled flow of hydraulic fluid to said chamber to cause a movement of said piston in one direction or another within the chamber.

2. The improvement of claim 1 wherein said housing for said endless chain includes means for being moved toward and away from said housing which carries said workpiece to thereby provide for a feeding motion between said stock removing tools and said workpiece.

3. The improvement of claim 2 wherein said housing which carries said workpiece includes means for being traversed relative to said endless chain irrespective of whether said clamping means is functioning to clamp the housing for the endless chain to said fixed structure.

* * * * *